Oct. 28, 1924.
H. W. MELLING
LATHE
Filed Feb. 27, 1923    3 Sheets-Sheet 3
1,512,995
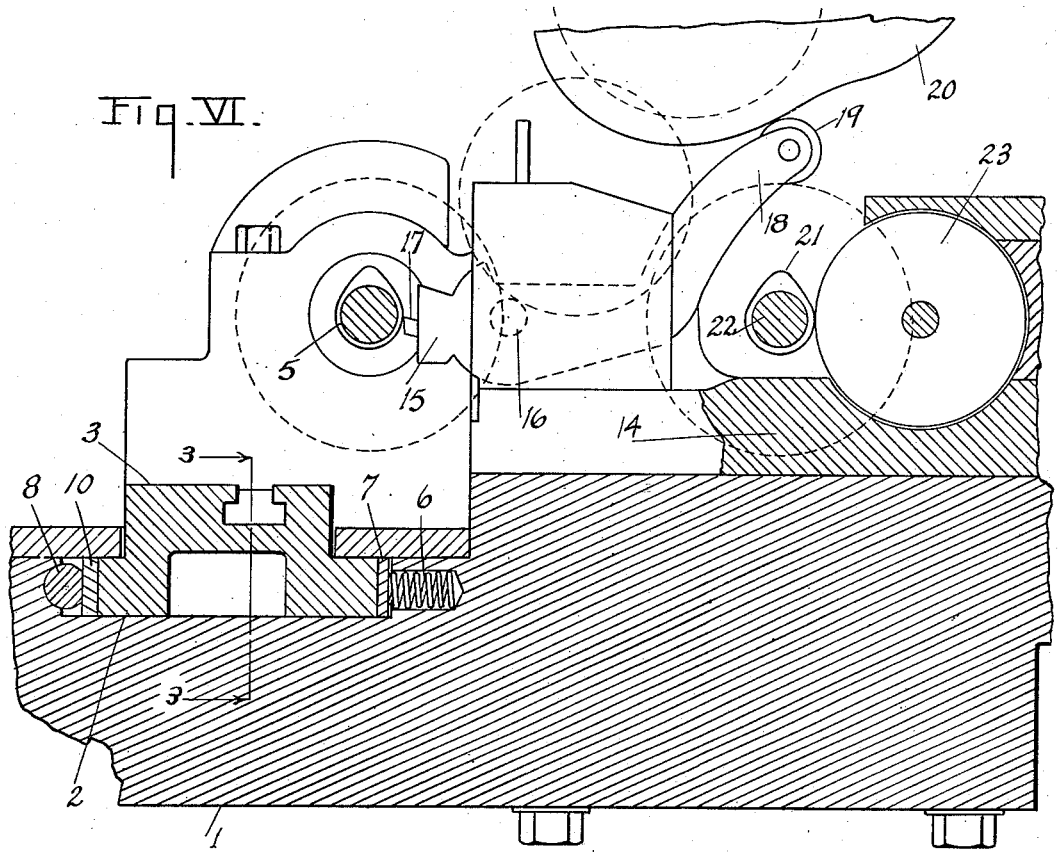
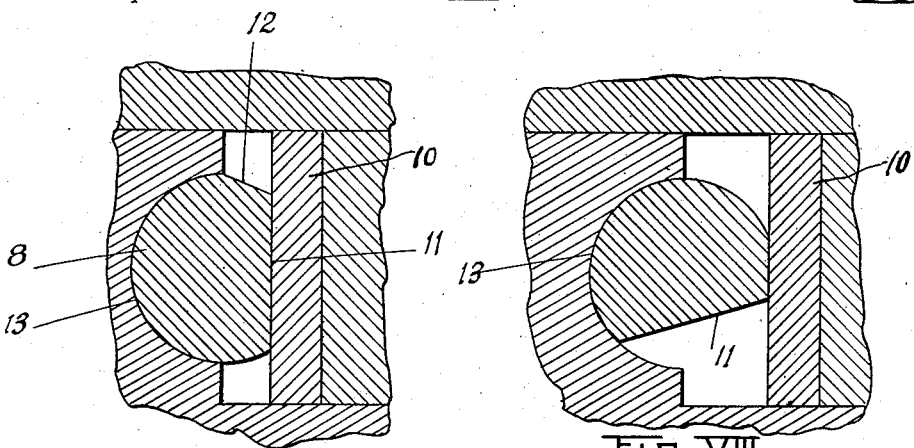
Inventor
Herman W. Melling
By Chappell & Earl
Attorneys Patented Oct. 28, 1924.

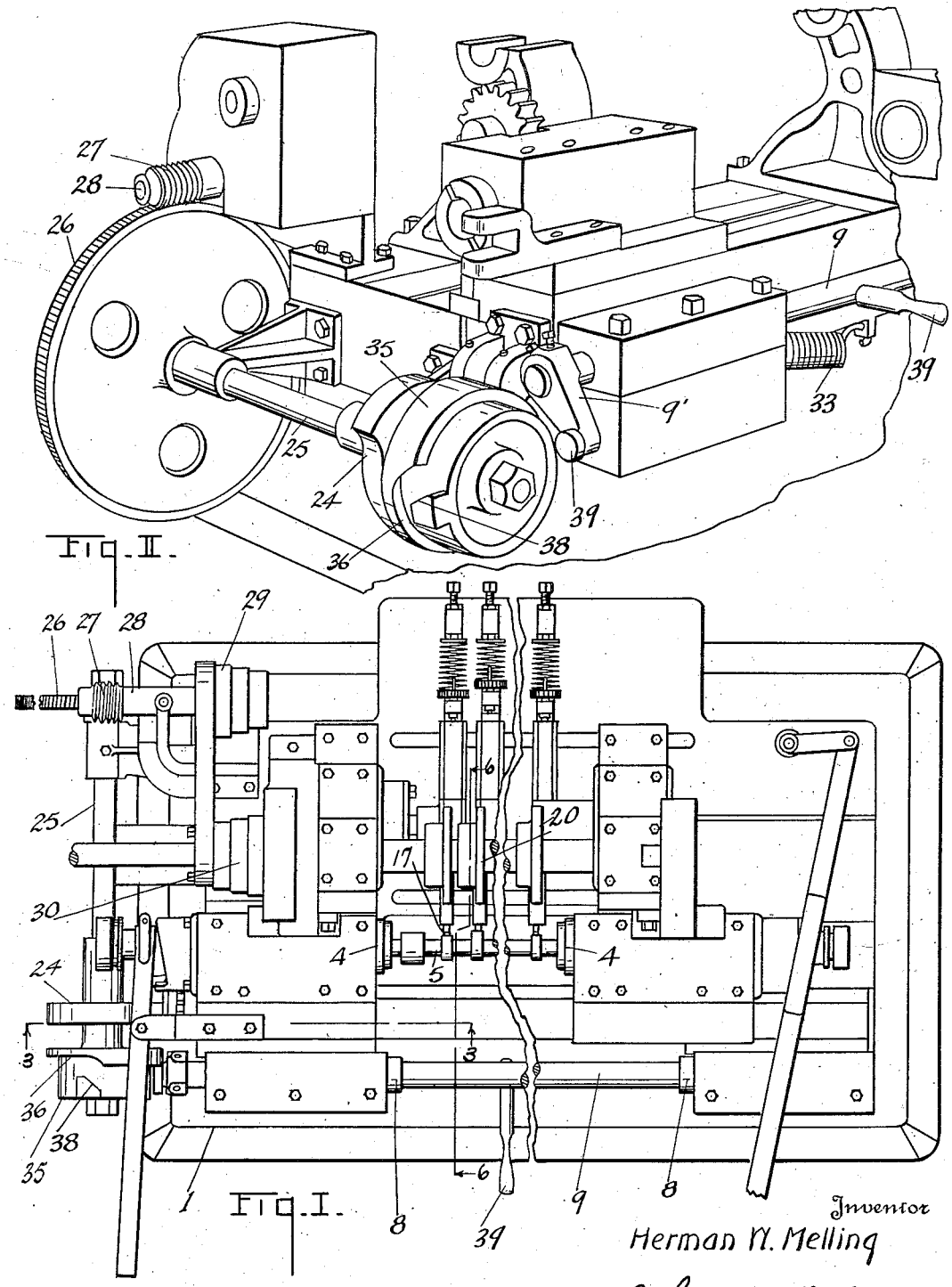

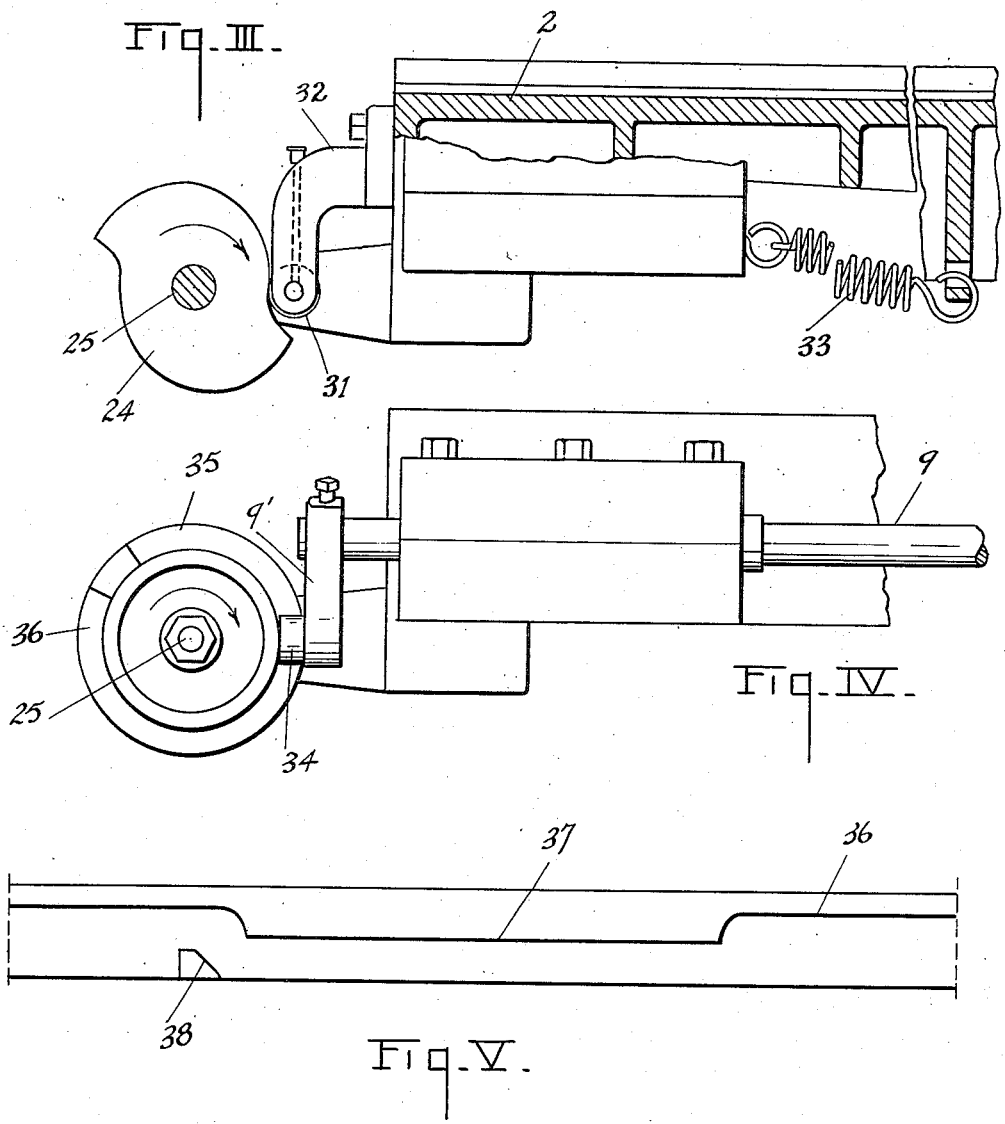

1,512,995

UNITED STATES PATENT OFFICE.

HERMAN W. MELLING, OF JACKSON, MICHIGAN.

LATHE.

Application filed February 27, 1923. Serial No. 621,502.

*To all whom it may concern:*

Be it known that I, HERMAN W. MELLING, a citizen of the United States, residing at the city and county of Jackson, State of Michigan, have invented certain new and useful Improvements in Lathes, of which the following is a specification.

This invention relates to improvements in lathes.

My improvements are especially designed by me for embodiment in lathes for turning cam shafts such as shown in my application for Letters Patent filed October 13, 1920, Serial No. 416,750 this application being in part a continuation thereof. I have illustrated and described the same herein as embodied in such machines although my improvements are readily adapted and desirable for use in machines performing other work.

The main objects of this invention are:

First, to provide an improved lathe which automatically takes a roughing and finishing cut.

Second, to provide an improved lathe embodying these advantages of taking and roughing and finishing cut which is simple and very rigid in structure so that the parts are effectively held in both positions.

Third, to provide an improved lathe in which the work carriage is laterally adjustable to regulate the depth of cut.

Further objects, and objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a fragmentary plan view of a lathe for turning cam shafts embodying the features of my invention, parts being shown conventionally and parts broken away for convenience in illustration.

Fig. II is a fragmentary perspective view of the left front corner of the machine showing details of the carriage feed and adjusting mechanism.

Fig. III is a fragmentary view partially in section on a line corresponding to line 3—3 of Figs. I and VI showing details of the carriage feed.

Fig. IV is a fragmentary front elevation view showing details of the carriage adjustment.

Fig. V is a view of the carriage adjustment cam extended.

Fig. VI is a detail vertical section on a line corresponding to the broken line 6—6 of Fig. I.

Fig. VII is an enlarged fragmentary section corresponding to that of Fig. VI showing the work-carriage adjusting cam in its neutral or initial position.

Fig. VIII is a fragmentary section corresponding to that of Fig. VII showing the work carriage adjustment cam in its first or roughing cut position.

In the drawing the sectional views are taken looking in the direction of the little arrows at the ends of the section lines and similar numerals of reference refer to similar parts throughout the several views.

Referring to the drawing, the bed 1 is provided with a suitable way 2 for the work carriage 3. The work carriage is provided with suitable chucks as 4, shown conventionally, for the work 5, a valve cam shaft being shown.

The work carriage is supported for lateral adjustment to regulate the cut, see Figs. VI, VII and VIII, the main purpose of this being to provide for a roughing cut and a finishing cut so that the work may be finished without removing from the machine and without attention after it is once arranged in the chucks.

The springs 6 urge the carriage forward, wear plates 7 being interposed between the carriage and these springs, the springs being seated in recesses in the bed as shown in Fig. VI.

The carriage is adjusted against the tension of these springs by means of cams 8 on the rockshaft 9, wear or thrust plates 10 being interposed between the carriage and these cams. The cams have a flattened surface 11 which allows the carriage to return to neutral position, a face 12 which adjusts the carriage for the roughing cut and a face 13 which supports the carriage for the finish cut.

I have not in the accompanying drawing attempted to maintain the relative proportion of parts in these views but it will be understood that the variation between these faces should be such as to provide the desired depth of cut.

I provide a tool carriage 14 having a tool holder 15 pivoted at 16 thereon, the cutter being shown at 17. This tool holder has a rearwardly and upwardly extending arm 18 carrying a roller 19 coacting with the cam 20. The movement of the tool carriage 14 is controlled by the pattern cams 21 on the shaft 22, these pattern cams corresponding in shape to the work to be cut or being replicas of the cams to be cut.

The carriage carries an abutment roller 23, the radius of which corresponds to the radius of the tool.

With the parts thus arranged, the point of contact of the cutter with the work corresponds to the point of contact of the pattern cam with the abutment, the cams 20 and 21 coacting in shaping the work as described in my application for Letters Patent hereinbefore referred to. The work and the cams 20 and 21 are driven in synchronism, the gear connections being indicated by dotted lines in Fig. VI.

The work carriage is fed in the structure illustrated by a double cam 24 mounted on the shaft 25 which is driven from a gear 26 meshing with a worm 27 on the shaft 28 which has a set of cone pulleys 29 connected with the cone pulleys 30 connected with one of the gears shown in Fig. VI, so that the parts are suitably timed and at the same time the speed of the feed may be regulated.

The cam 24 coacts with a roller 31 on an arm 32 on the carriage 2, see Fig. III, so that two feed strokes of the carriage are provided for each rotation of the shaft 25, the spring 33 returning the carriage and holding the roller 31 firmly against the cam.

The table adjusting rock shaft 9 has an arm 9' thereon provided with a roller 34 coacting with the cam 35 on the shaft 25. This cam is shown in extended form in Fig. V, and has a portion 36 and a raised portion 37, the roller travelling on the portion 36 when the rockshaft is in the position shown in Fig. VIII, and on the raised portion 37 when the cam is in the position shown in Fig. VI or in position for the finish cut. The projection 38 insures the return of the cam, a handle 39 being provided for the rockshaft to adjust it to the neutral or work-chucking position shown in Fig. VII. As the work is chucked the lever 39 is operated to bring the rockshaft to the position shown in Fig. VIII. When the roughing cut is completed the carriage is returned and the table is adjusted laterally for the second or finishing cut.

While I provide for only two cuts in this machine illustrated, it will be understood that the number of cuts and adjustments may be increased as desired.

I have illustrated and described my improvements in an embodiment which I have found very practical in the manufacture of valve cam shafts for internal combustion engines. I have not attempted to illustrate or describe other modifications and adaptations which I contemplate as these may be very considerably varied without departing from my invention, and I believe the disclosure made will enable the adaptation or embodiment of my improvements as may be desired.

Having thus described my invention what I claim as new and desire to secure by Letters Patent is:

1. In a structure of the class described, the combination of a work carriage mounted for lateral adjustment for determining the depth of cut, springs urging said carriage yieldingly outward, a rockshaft having cams for laterally adjusting said carriage step by step and supporting it in its adjusted positions against the thrust of said springs, a double feed cam for said carriage, a feed return spring for said carriage, an actuating cam for said rockshaft, said feed cam and actuating cam being timed so that the actuating cam is actuated at the end of the first feed stroke of the carriage, a hand lever for adjusting said rock shaft, a tool carriage movable laterally of said work carriage, a tool carried by said tool carriage, a control cam for said tool carriage, means for retaining the position of the tool relative to the work as the work revolves, and driving means for said control cam, the work and said feed and adjusting cams.

2. In a structure of the class described, the combination of a work carriage mounted for lateral adjustment for determining the depth of cut, springs urging said carriage yieldingly outward, a rockshaft having cams for laterally adjusting said carriage step by step and supporting it in its adjusted position against the thrust of said springs, a double feed cam for said carriage, a feed return spring for said carriage, an actuating cam for said rockshaft, a hand lever for adjusting said rockshaft, a tool carriage movable laterally of said work carriage, a tool carried by said tool carriage, a control cam for said tool carriage, and means for maintaining the position of the tool relative to the work as the work revolves.

3. In a structure of the class described, the combination of a work carriage mounted for lateral adjustment for determining the depth of cut, springs urging said carriage yieldingly outward, a rockshaft having cams for laterally adjusting said carriage step by step and supporting it in its adjusted positions against the thrust of said springs, a feed means for said carriage providing a plurality of feed strokes, an actuating cam for said rockshaft timed with said feed means, a tool carriage movable laterally of said work carriage, a tool carried by said tool carriage, a control means for said tool carriage, and means for maintaining the position of the tool relative to the work as the work revolves.

4. In a structure of the class described, the combination of a work carriage mounted for lateral adjustment for determining the depth of cut, a rock shaft having cams for laterally adjusting said carriage step by step, a feed means for said carriage providing a plurality of feed strokes, an actuating cam for said rock shaft timed with said feed means, a tool carriage movable laterally of said work carriage, a tool carried by said tool carriage, a control means for said tool carriage, and means for maintaining the position of the tool relative to the work as the work revolves.

5. In a structure of the class described, the combination of a work carriage mounted for lateral adjustment for determining the depth of cut, a feed means for said carriage providing a plurality of feed strokes, an actuating means for said feed adjusting means timed with said feed means, a tool carriage movable laterally of said work carriage, a tool carried by said tool carriage, a control means for said tool carriage, and means for maintaining the position of the tool relative to the work.

6. In a structure of the class described, the combination of a reciprocating tool carriage, a tool holder pivotally mounted on said tool carriage, a tool carriage control cam which is a replica of the work to be cut, a cam for oscillating said tool holder whereby the reciprocation of the tool carriage and the oscillation of the tool thereon coact in shaping the work, a work carriage reciprocating in a path at right angles to the path of the tool carriage, said work carriage being mounted for lateral adjustment to determine the depth of cut, means for laterally adjusting said work carriage, work carriage feed means comprising an automatic return means whereby successive cuts are secured, and operating connections for said carriage adjusting and feed means and feed tool carriage and tool control cams whereby the movement of the several parts is synchronized.

7. In a structure of the class described, the combination of a reciprocating tool carriage, a tool holder pivotally mounted on said tool carriage, a tool carriage control cam which is a replica of the work to be cut, a cam for oscillating said tool holder whereby the reciprocation of the tool carriage and the oscillation of the tool thereon coact in shaping the work, a work carriage reciprocating in a path at right angles to the path of the tool carriage, said work carriage being mounted for lateral adjustment to determine the depth of cut, and means for laterally adjusting said work carriage.

8. In a structure of the class described, the combination of a reciprocating tool carriage, a work carriage reciprocating in a path at right angles to the path of the tool carriage, said work carriage being mounted for lateral adjustment to determine the depth of cut, means for laterally adjusting said work carriage, work carriage feed means comprising an automatic return means whereby successive cuts are secured, and operating connections for said carriage adjusting and feed means and feed tool carriage and tool control cams whereby the movement of the several parts is synchronized.

9. In a structure of the class described, the combination of a work carriage mounted for lateral adjustment for determining the depth of cut, springs urging said carriage yieldingly outward, a rockshaft having cams for laterally adjusting said carriage step by step and supporting it in its adjusted positions against the thrust of said springs, a double feed cam for said carriage, a feed return spring for said carriage, an actuating cam for said rockshaft, said feed cam and actuating cam being mounted on the same shaft and timed so that the actuating cam is actuated at the end of the first feed stroke of the carriage, and a hand lever for adjusting said rock shaft.

10. In a structure of the class described, the combination of a work carriage mounted for lateral adjustment for determining the depth of cut, springs urging said carriage yieldingly outward, and a rockshaft having cams for laterally adjusting said carriage step by step and supporting it in its adjusted positions against the thrust of said springs.

11. In a structure of the class described, the combination of a reciprocating tool carriage, a tool holder pivotally mounted on said tool carriage, a pattern cam corresponding in shape to the shape of the work to be cut for controlling said tool carriage, said tool carriage being provided with an abutment with which said pattern cam coacts, a cam for oscillating said tool holder so that the cutting edge of the tool engages the work at a point corresponding to the point of contact of the pattern cam with its abutment, a work carriage mounted for lateral adjustment to determine the depth of cut, feed means therefor comprising a double cam and a return spring whereby successive cuts are secured, a cam for laterally adjusting said carriage, and means for simultaneously operating said tool carriage control and said tool oscillating cams and said work carriage feed and adjusting cams.

12. In a structure of the class described, the combination of a reciprocating tool carriage, a tool holder pivotally mounted on said tool carriage, a control cam for said tool carriage, a cam for oscillating said tool holder, a work carriage mounted for lateral adjustment to determine the depth of cut, feed means therefor comprising a double cam and return spring whereby successive cuts are secured, a cam for laterally adjusting said carriage, and operating connections for said several cams.

13. In a structure of the class described, the combination with a tool, of a work carriage mounted for lateral adjustment for determining the depth of cut, a spring urging said carriage yieldingly outward, a cam for laterally adjusting said carriage step by step and supporting it in its adjusted position against the thrust of said spring, and a feed means for said carriage providing a plurality of cuts.

14. In a structure of the class described, the combination with a tool, of a work carriage mounted for lateral adjustment for determining the depth of cut, a spring urging said carriage yieldingly outward, a cam for laterally adjusting said carriage step by step and supporting it in its adjusted position against the thrust of said spring, a feed cam for said carriage, a feed return spring for said carriage, and an actuating cam for said adjusting cam, said carriage, said cam and actuating cam being timed, for the purpose specified.

15. In a structure of the class described, the combination with a tool, of a work carriage mounted for lateral adjustment for determining the depth of cut, a spring urging said carriage yieldingly outward, and a cam for laterally adjusting said carriage step by step and supporting it in its adjusted position against the thrust of said spring.

16. In a structure of the class described, the combination with a tool, of a way, a work carriage mounted on said way for lateral adjustment for determining the depth of cut and for longitudinal feeding movement, means for effecting such lateral adjustment step by step, feed means for said carriage comprising automatic return means thereby providing a plurality of cuts, and operating connections for said carriage adjusting and feed means whereby the carriage is adjusted for the successive cuts.

17. In a structure of the class described, the combination with a tool, of a way, a work carriage mounted on said way for lateral adjustment for determining the depth of cut and for longitudinal feeding movement, means for effecting such lateral adjustment step by step, and feed means for said carriage comprising automatic return means thereby providing a plurality of cuts.

18. In a structure of the class described, the combination with a tool, of a way, a work carriage mounted on said way for lateral adjustment for determining the depth of cut and for longitudinal feeding movement, means for effecting such lateral adjustment, feed means for said carriage, and operating connections for said carriage adjusting and feed means whereby the carriage is automatically adjusted for the successive cuts.

19. In a structure of the class described, the combination with a tool, of a way, a work carriage mounted on said way for lateral adjustment for determining the depth of cut and for longitudinal feeding movement, means for effecting such lateral adjustment, and feed means for said carriage.

20. In a structure of the class described, the combination with a bed provided with a single carriage slideway, a carriage slidably supported on said way for lateral cut adjustment and longitudinally of said way for feeding movement, cams for laterally adjusting said carriage in said way and supporting it in its adjusted positions while permitting its feeding movement, means for automatically securing a plurality of feed strokes, and means for adjusting said cams synchronized with said feed means.

21. In a structure of the class described, the combination with a bed provided with a single carriage slideway, a carriage slidably supported on said way for lateral cut adjustment and longitudinally of said way for feeding movement, and cams for laterally adjusting said carriage in said way and supporting it in its adjusted positions while permitting its feeding movement.

22. In a structure of the class described, the combination with a bed provided with a single work carriage slideway, a tool, a carriage mounted in said way for feeding movement and for cut adjusting movement laterally of said feeding movement, means for providing a plurality of cut adjustments for said carriage and supporting it for feeding movement in its adjusted position, feed means for said carriage, and operating connections for said cut adjusting means and said carriage feed means.

23. In a structure of the class described, the combination with a bed provided with a single carriage slideway, a carriage mounted in said way for feeding movement and for cut adjusting movement laterally of said feeding movement, means for providing a plurality of cut adjustments for said carriage and supporting it for feeding movement in any of its adjusted positions, and feed means for said carriage.

24. In a structure of the class described, the combination of a carriage, a single way in which said carriage is mounted for feeding movement and for adjustment transversely of its feeding movement to determine the depth of cut, cut adjusting means adapted to permit the feeding movement of said carriage, and carriage feed means operatively associated with said cut adjusting means.

25. In a structure of the class described, the combination of a carriage, a single way in which said carriage is mounted for feeding movement and for adjustment transversely of its feeding movement to determine the depth of cut, and cut adjusting means adapted to permit the feeding movement of said carriage and carriage feed means.

26. In a structure of the class described, the combination with a bed provided with a single work carriage slideway, a work carriage mounted on said way for longitudinally feeding movement and lateral movement to determine the depth of the cut, and a tool operatively associated with said work carriage.

27. In a structure of the class described, the combination of a carriage, and a single way in which said carriage is mounted for feeding movement and for adjustment transversely of its feeding movement to determine the depth of the cut.

In witness whereof, I have hereunto set my hand and seal.

HERMAN W. MELLING. [L. S.]